US009084262B2

(12) United States Patent
Chin et al.

(10) Patent No.: US 9,084,262 B2
(45) Date of Patent: Jul. 14, 2015

(54) COORDINATING TRANSMISSION HOLD AND RESUME IN TD-SCDMA

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 530 days.

(21) Appl. No.: 12/964,496

(22) Filed: Dec. 9, 2010

(65) Prior Publication Data
US 2012/0020331 A1 Jan. 26, 2012

Related U.S. Application Data

(60) Provisional application No. 61/366,873, filed on Jul. 22, 2010.

(51) Int. Cl.
*H04W 4/00* (2009.01)
*H04W 76/04* (2009.01)
*H04W 36/00* (2009.01)
*H04W 88/06* (2009.01)

(52) U.S. Cl.
CPC ........ *H04W 76/048* (2013.01); *H04W 36/0088* (2013.01); *H04W 88/06* (2013.01)

(58) Field of Classification Search
CPC ......... H01L 47/10; H01L 47/35; H01L 47/30; H01L 47/32; H01L 1/0025; H04B 7/2125; H04B 7/2126; H04W 80/04; H04W 36/18; H04W 36/0011; H04W 36/14; H04W 36/08
USPC ......... 370/349, 314, 324, 350, 235, 331, 332, 370/333
See application file for complete search history.

(56) References Cited

U.S. PATENT DOCUMENTS

| 7,286,841 | B2 * | 10/2007 | Sun et al. ...................... 455/502 |
| 7,586,847 | B2 * | 9/2009 | Julka et al. .................... 370/235 |
| 7,817,595 | B2 * | 10/2010 | Wu ................................ 370/328 |
| 8,364,159 | B2 * | 1/2013 | Turner .......................... 455/451 |
| 2002/0163938 | A1 | 11/2002 | Tuomainen et al. |
| 2003/0139184 | A1 * | 7/2003 | Singh et al. ................... 455/436 |

(Continued)

FOREIGN PATENT DOCUMENTS

| CN | 101272568 A | 9/2008 |
| EP | 1981188 | 10/2008 |

OTHER PUBLICATIONS

Durastante G. et al., "An efficient monitoring strategy for intersystem handover from TD-SCDMA to GSM networks", Personal, Indoor and Mobile Radio Communications, 2002. The 13th IEEE International Symposium on Sep. 15-18, 2002, Piscataway, NJ, USA,IEEE, vol. 4, 1 Sep. 15, 2002, pp. 1555-1560, XP010611527, ISBN: 978-0-7803-7589-5.

(Continued)

*Primary Examiner* — Brenda H Pham
(74) *Attorney, Agent, or Firm* — Kristine U. Ekwueme

(57) ABSTRACT

Wireless communication in a radio access network may be implemented where a user equipment (UE) sends a hold signal to a Node B indicating that data transmission to the UE is to be put on hold. The UE may resume data transmission from the Node B by sending a resume signal to the Node B. During the hold in transmission, the UE may measure a GSM network to assist in handover of the UE between a TD-SCDMA network and a GSM network.

32 Claims, 7 Drawing Sheets

(56) References Cited

U.S. PATENT DOCUMENTS

| | | |
|---|---|---|
| 2010/0034148 A1 | 2/2010 | Zhang et al. |
| 2010/0226295 A1* | 9/2010 | Sun et al. ............... 370/294 |
| 2010/0279677 A1* | 11/2010 | Dwyer et al. ............ 455/422.1 |
| 2010/0315948 A1* | 12/2010 | Yi et al. ............... 370/235 |

OTHER PUBLICATIONS

International Search Report and Written Opinion—PCT/US2011/045127—ISA/EPO—Nov. 10, 2011.

Taiwan Search Report—TW100126030—TIPO—Apr. 8, 2014.

\* cited by examiner

| SS Bits | SS Command | Meaning |
|---|---|---|
| 00 | "Normal" | Normal transmission resumes or is in progress |
| 11 | "On Hold" | Downlink / Uplink transmission is on hold |

FIG. 5

COORDINATING TRANSMISSION HOLD AND RESUME IN TD-SCDMA

CROSS REFERENCE TO RELATED APPLICATION

This application claims the benefit of U.S. provisional patent application No. 61/366,873 filed Jul. 22, 2010, in the names of CHIN et al., the disclosure of which is expressly incorporated herein by reference in its entirety.

BACKGROUND

1. Field

Aspects of the present disclosure relate generally to wireless communication systems, and more particularly, to coordinating data transmission hold and resume in time division-synchronous code division multiple access (TD-SCDMA) systems.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

In one aspect of the disclosure, a method of wireless communication includes transmitting a first physical layer command to a Node B of a time division-synchronous code division multiple access (TD-SCDMA) network to suspend data transmission. The method also includes transmitting a second physical layer command to the Node B to resume data transmission.

In another aspect of the disclosure, a user equipment (UE) configured for wireless communication in a multicarrier radio access network includes means for transmitting a first physical layer command to a Node B of a time division-synchronous code division multiple access (TD-SCDMA) network to suspend data transmission. The UE also includes means for transmitting a second physical layer command to the Node B to resume data transmission.

In another aspect of the disclosure, a computer program product includes a computer-readable medium having program code recorded thereon. The program code includes code to transmit a first physical layer command to a Node B of a time division-synchronous code division multiple access (TD-SCDMA) network to suspend data transmission. The program code also includes code to transmit a second physical layer command to the Node B to resume data transmission.

In another aspect of the disclosure, a UE configured for wireless communication includes at least one processor and a memory coupled to the processor. The processor is configured to transmit a first physical layer command to a Node B of a time division-synchronous code division multiple access (TD-SCDMA) network to suspend data transmission. The processor is also configured to transmit a second physical layer command to the Node B to resume data transmission.

BRIEF DESCRIPTION OF THE DRAWINGS

FIG. 5 is a table showing data transmission normal and hold signals according to one aspect of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
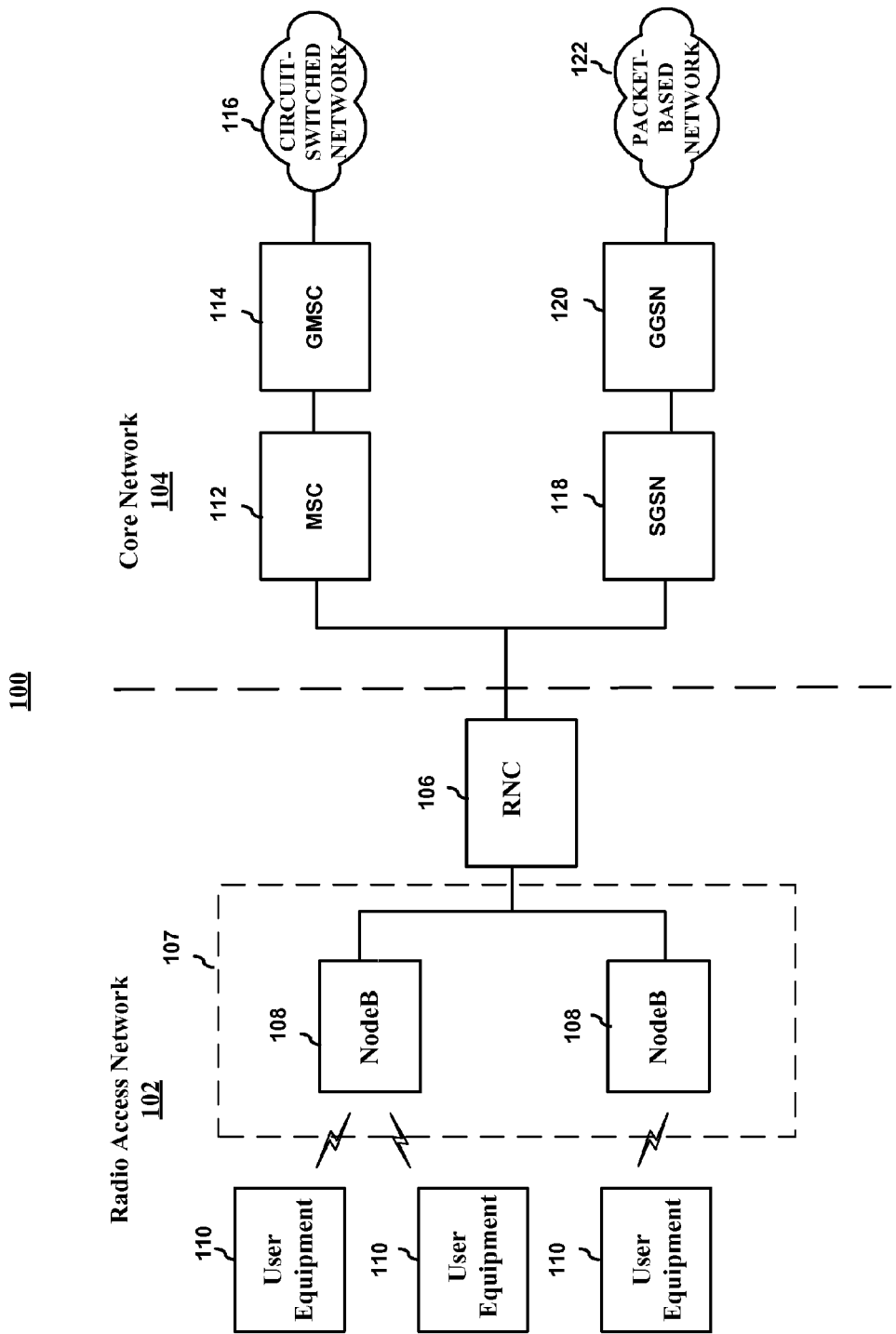
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs), such as an RNS 107, each controlled by a Radio Network Controller (RNC), such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces, such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node. Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

Figure 2:
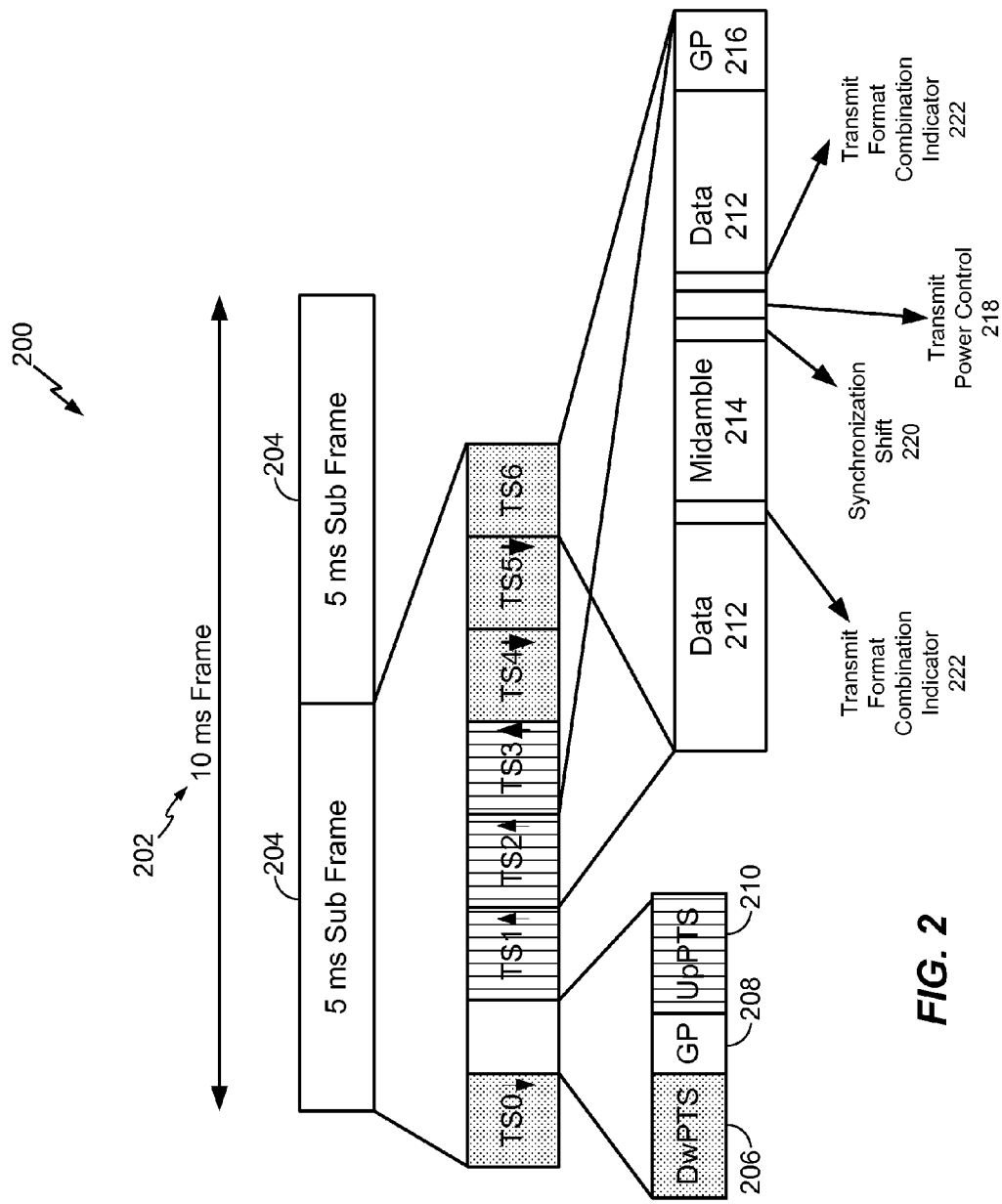
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The chip rate in TD-SCDMA is 1.28 Mcps. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 (each with a length of 352 chips) separated by a midamble 214 (with a length of 144 chips) and followed by a guard period (GP) 216 (with a length of 16 chips). The midamble 214 may be used for features, such as channel estimation, while the guard period 216 may be used to avoid inter-burst interference. Also transmitted in the data portion is some Layer 1 control information, including Transmit Power Control (TPC) bits 218, Synchronization Shift (SS) bits 220, and Transmit Format Combination Indicator (TFCI) bits 222. Synchronization Shift bits 220 and Transmit Power Control bits 218 only appear in the second part of the data portion.

The Transmit Format Combination Indicator bits 222 can indicate the format of a CCTrCH (Coded Composite Transport Channel). The Transmit Power Control bits 218 can indicate to the receiving node an up or down transmit power command. The Synchronization Shift bits 220 immediately following the midamble can indicate three cases: decrease shift, increase shift, or do nothing in the upload transmit timing. The positions of the SS bits 220 are not used during uplink communications.

Figure 3:
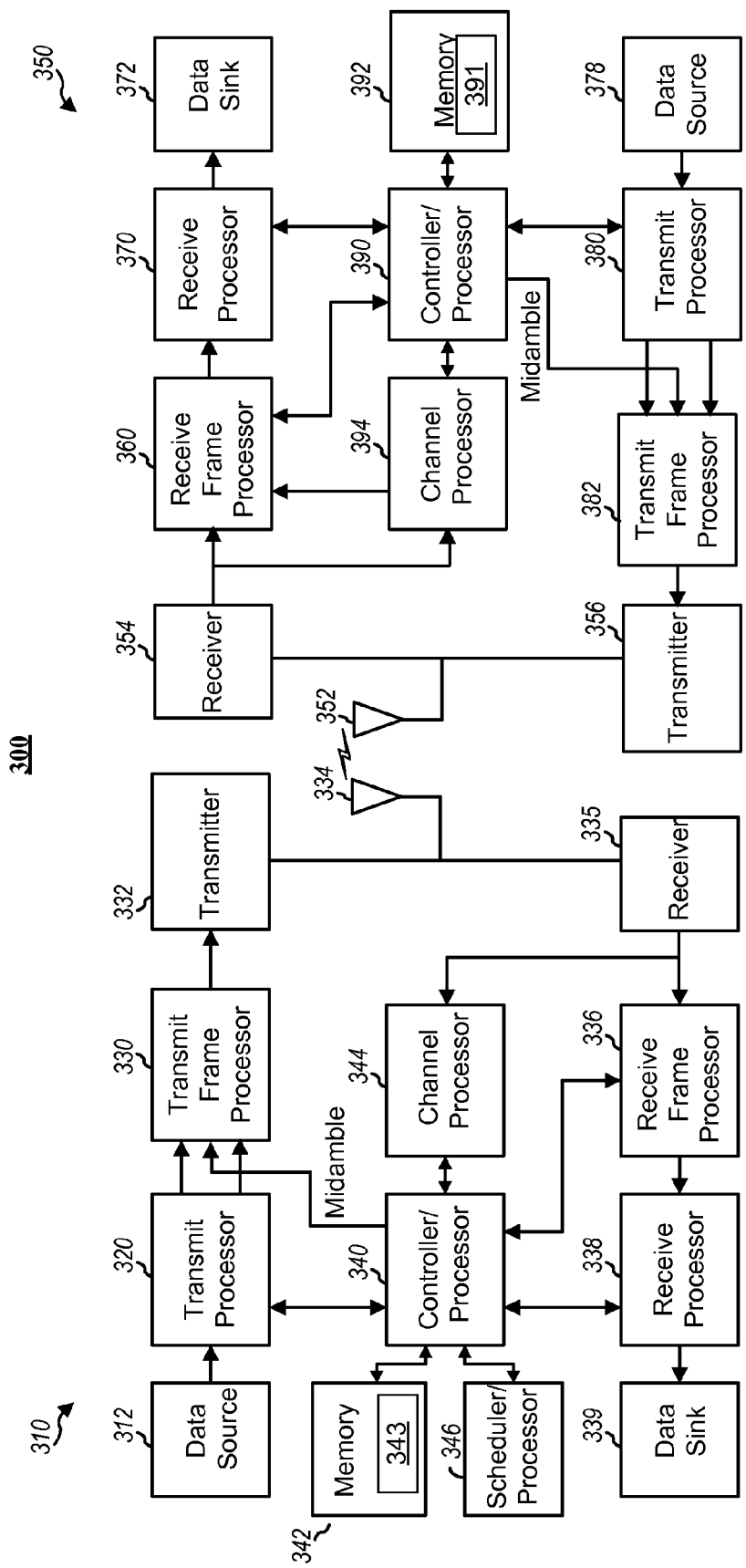
FIG. 3 is a block diagram conceptually illustrating an example of a Node B in communication with a UE in a telecommunications system.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard, pointing device, track wheel, and the like). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the smart antennas 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor 340, respectively. If some of the frames were unsuccessfully decoded by the receive processor 338, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the Node B 310 and the UE 350, respectively. For example, the memory 392 of the UE 350 may store a data transmission hold/resume module 391 that, when executed by the controller/processor 390, allows the UE 350 to transmit codes to the Node B 310 requesting the Node B 310 to hold or resume data transmission. Similarly, the memory 342 of the Node B 310 may store a data transmission hold/resume module 343 that, when executed by the controller/processor 340, configures the Node B 310 to hold data transmission to a UE upon receipt of a hold data transmission request and to resume data transmission to a UE upon receipt of a resume data transmission request. A scheduler/processor 346 at the Node B 310 may be used to allocate resources to the UEs and schedule downlink and/or uplink transmissions for the UEs.

Individual UEs may desire to switch between communication systems, such as handing over between TD-SCDMA and GSM networks. As part of that handover process, while in a connected mode with a first system (e.g., TD-SCDMA) a UE may want to perform a measurement of the other (e.g., GSM) network. In particular, the UE tunes to the GSM channel to acquire frequency and timing information (e.g., timing of a Frequency Correction Channel (FCCH) in the case of GSM) to prepare for a handover of the UE between the TD-SCDMA and GSM systems. For handover to GSM, the UE also reads Base Station Identity Code (BSIC) information of a Synchronization Channel (SCH) and measures the signal strength of the FCCH of neighbor GSM cells.

Figure 4:
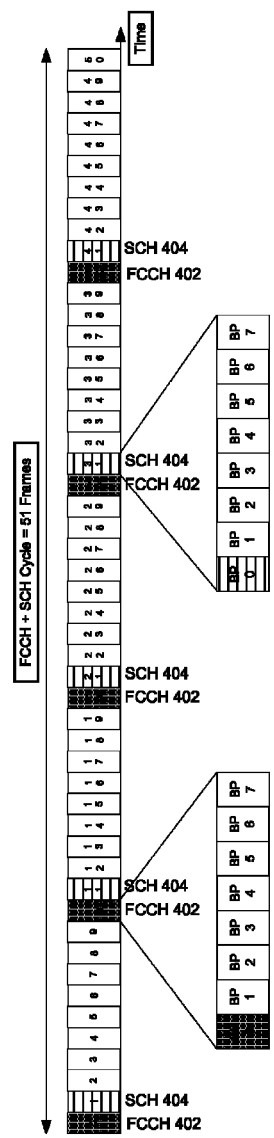
FIG. 4 is a block diagram illustrating a GSM frame cycle.

FIG. 4 is a block diagram illustrating a GSM frame cycle. The GSM frame cycle for FCCH (Frequency Correction Channel) 402 and SCH (Synchronization Channel) 404 consists of 51 frames, each of 8 BPs (Burst Periods). The FCCH 402 is in the first Burst Period (or BP 0) of frame 0, 10, 20, 30, 40, and the SCH 504 is in the first Burst Period of frame 1, 11, 21, 31, 41. A single Burst Period is 15/26 ms and a single frame is 120/26 ms. As shown in FIG. 4 the FCCH period is 10 frames (46.15 ms) or 11 frames (51.77 ms). Also as shown, the SCH period is 10 frames or 11 frames.

As noted above, during the handover process the UE tunes to the GSM channel to acquire information from the GSM network. Because the available TD-SCDMA continuous time slots are limited (for example, only two or three continuous timeslots are typically available in a radio frame), the UE has limited time to measure the GSM cells and cannot complete a full measurement during a single set of continuous time slots. Thus, a portion of the measurement occurs during the first set of continuous time slots, a further portion of the measurement occurs during the available set of continuous time slots in the next cycle, etc., until enough time was provided to complete the measurement. Consequently, a slower than desired TD-SCDMA to GSM handover occurs.

One solution to reduce this delay is for the UE to signal the TD-SCDMA network that the network should temporarily halt data transmission to the UE. During the transmission gap, the UE can perform GSM measurement. Once the UE completes the measurement, the UE can then signal the network to remove the hold and resume normal data transmission.

To communicate the hold/resume between the UE and the network, in one embodiment, the uplink Synchronization Shift (SS) bits are used. One embodiment of using the SS bits in this manner is shown in FIG. 5. The UE indicates its desire for normal data transmission to the network by sending uplink SS bits set to 00. The UE indicates its desire for a hold on data transmission by sending uplink SS bits set to 11. Such indications from the UE to the network can be used to hold data transmission for any purpose, such as to measure the GSM network, to slow down data to a UE during a call, i.e., to control flow of data, or other purposes.

According to one embodiment, the communications between the UE and the network proceed as follows. If the UE should tune away from the TD-SCDMA network, the UE sends uplink SS bits set to the "On Hold" command to the Node B. To ensure receipt by the Node B, the UE may send the "On Hold" command continuously to the Node B for several subframes. To ensure the Node B receives the commands, the UE monitors to determine if the Node B has stopped the data transmission of the downlink DPCH (Dedicated Physical Channel). If the Node B stopped the downlink data transmission, the UE can stop transmitting the uplink DPCH, including the SS bits. Once the Node B has begun data transmission hold, it monitors the uplink DPCH for a command to resume data transmission. With data transmission hold achieved, the UE can now perform other functions, including tuning away from the TD-SCDMA network to measure GSM cells.

Following completion of the alternate UE activity, the UE can indicate to the TD-SCDMA network that data transmission may resume by sending the uplink SS bits set to the "Normal" command. Once the Node B receives the "Normal" command the Node B resumes data transmission of the downlink DPCH. Once the UE recognizes that data transmission has resumed, it may cease transmission of the "Normal" command using the uplink SS bits.

Figure 6:
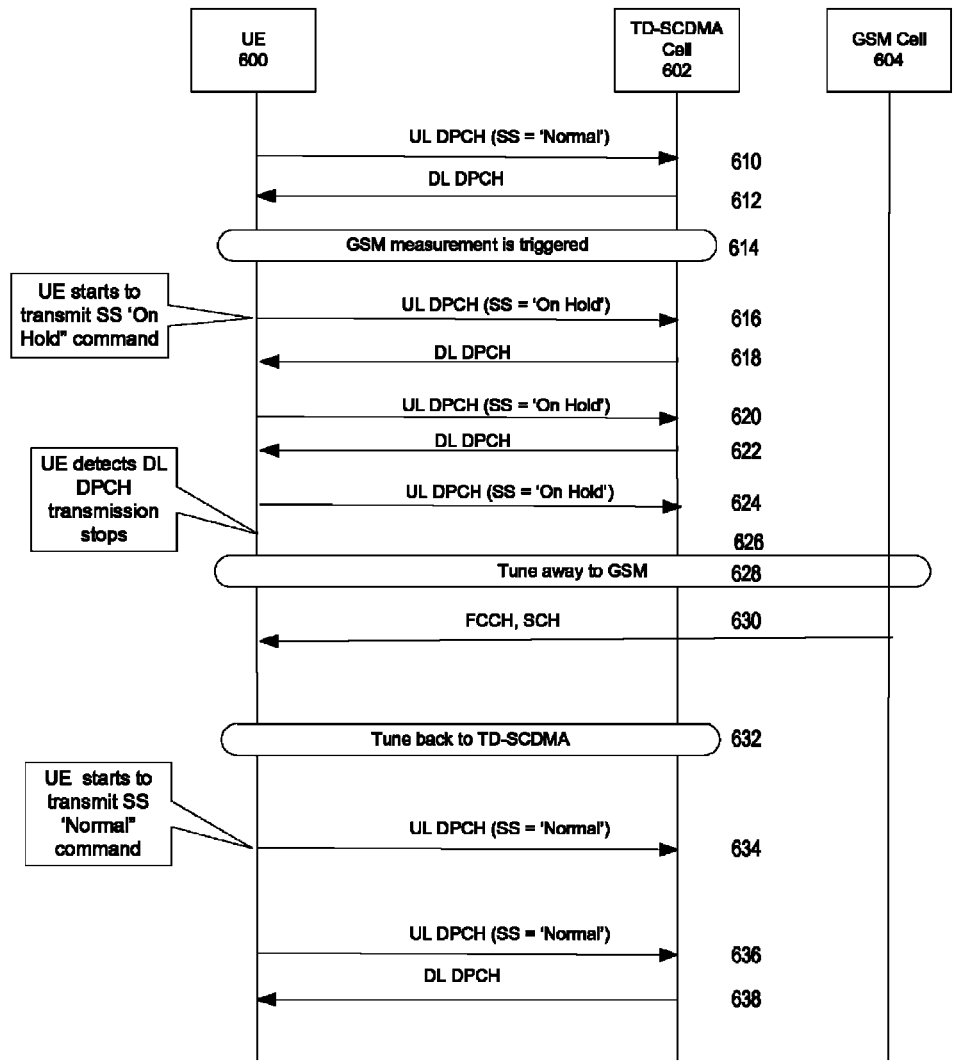
FIG. 6 is a call flow diagram illustrating data transmission hold and resume according to one aspect of the present disclosure.

FIG. 6 shows a call flow diagram illustrating data transmission hold and resume according to one aspect of the present disclosure.

At time 610 the UE 600 requests normal data transmission and thus transmits the "Normal" command, for example on the uplink dedicated physical channel (UL DPCH) SS bits to the TD-SCDMA network 602. At time 612 the network 602 transmits data normally to the UE 600, for example on the downlink dedicated physical channel (DL DPCH). At time 614 the desire to perform GSM measurement is recognized in the UE 600. At time 616, to halt data transmission from the TD-SCDMA network 602, the UE 600 sends a "On Hold" command to the TD-SCDMA network 602, for example in the uplink SS bits of the uplink dedicated physical channel (UL DPCH). At time 618 the UE 600 still receives data from the network, for example on the downlink dedicated physical channel (DL DPCH). Thus, the UE 600 resends the "On Hold" command at time 620. At time 622 the UE 600 again receives data from the network 602, so again, at time 624, the UE 600 sends the "On Hold" command to the network 602.

At time 626, following the most recent "On Hold" command, the UE 600 recognizes that data transmission from the network 602 has stopped, for example on the downlink dedicated physical channel (DL DPCH). At time 628 the UE 600 then turns attention to a different task, in the present illustration, tuning to the GSM network 604 for measurement. At time 630, the UE 600 receives the desired GSM signal, including the Frequency Correction Channel (FCCH) and the Synchronization Channel (SCH) information.

At time 632 the UE 600 has completed its task and tunes back to the TD-SCDMA network 602. At time 634 the UE 600 sends the "Normal" command to the network, for example on the uplink dedicated physical channel (UL DPCH) SS bits. The UE 600 continues to send the "Normal" command, as shown at time 636, until the UE 600 begins to receive data once again from the TD-SCDMA network 602, shown at time 638.

To ensure proper communication of the "On Hold" and "Normal" signals between the UE and the Node B it is preferable for the UE to repeat its "On Hold" and "Normal" transmissions to ensure receipt by the Node B. To avoid false detection, it is also preferable for the Node B to wait until it receives more than one "On Hold" or "Normal" command before holding or resuming transmission as commanded.

The proposed solution provides explicit signaling by reusing the existing physical layer control information bits to request a suspension in data transmission to facilitate other UE activity, such as measurement of a GSM cell. The UE can adjust the time interval for the other activity and indicate that data transmission should resume to the UE when desired. Using this solution can allow the UE to efficiently measure a GSM cell while reducing the latency of a TD-SCDMA to GSM handover.

Figure 7:
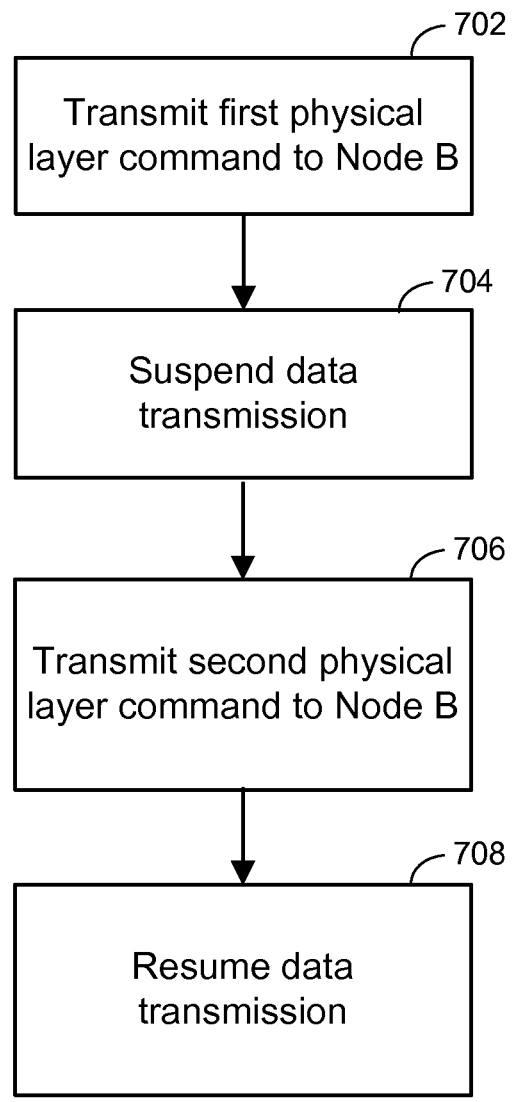
FIG. 7 is a flow diagram illustrating data transmission hold and resume according to one aspect of the present disclosure.

FIG. 7 is a flow diagram illustrating data transmission hold and resume according to one aspect of the present disclosure. An apparatus, such as the UE 110 is configured to transmit a first physical layer command to a Node B as shown in block 702. At block 704 data transmission is suspended. At block 706 the UE 110 transmits a second physical layer command to a Node B as shown in block 706. At block 708 data transmission is resumed.

In one configuration, the apparatus, such as the Node B 310, is configured for wireless communication and includes means for receiving data transmission hold and normal commands from a UE. In one aspect, the aforementioned means may be the antennas 334, the transmitter 332, the transmit frame processor 330, the channel processor 344, the transmit processor 320, the controller/processor 340, and the memory 342 storing a data transmission hold/resume module 343 all of which are configured together to perform the functions recited by the aforementioned means. In another aspect, the aforementioned means may be a module or any apparatus configured to perform the functions recited by the aforementioned means.

Several aspects of a telecommunications system have been presented with reference to a TD-SCDMA and GSM system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   determining, at a user equipment (UE) prior to transmitting a first physical layer command, whether to measure a first wireless network;
   transmitting, from the UE, the first physical layer command to a Node B of a second wireless network to suspend data transmission, the first physical layer command being transmitted when determining to measure the first wireless network;
   detecting, at the UE, that the Node B has suspended the data transmission;
   tuning away from the second wireless network to measure the first wireless network;
   measuring, at the UE, the first wireless network after tuning away; and transmitting, from the UE, a second physical layer command to the Node B to resume data transmission after the measurement of the first wireless network is completed.

2. The method of claim 1 in which the first physical layer command and the second physical layer command are transmitted using uplink synchronization shift bits.

3. The method of claim 1 in which the data transmission is on at least one of a downlink dedicated physical channel and an uplink dedicated physical channel.

4. The method of claim 1 further comprising, prior to transmitting the first physical layer command, determining to perform a flow control of data.

5. The method of claim 4 further comprising, prior to transmitting the second physical layer command, determining not to perform the flow control of data.

6. The method of claim 1 further comprising repeating transmission of the first physical layer command until detecting that the data transmission has been suspended.

7. The method of claim 1 further comprising repeating transmission of the second physical layer command until detecting that the data transmission has resumed.

8. The method of claim 1 in which the second wireless network comprises a time division-synchronous code division multiple access (TD-SCDMA) network.

9. A user equipment (UE) configured for wireless communication in a multicarrier radio access network, the UE comprising:
 means for determining, prior to transmitting a physical layer command, whether to measure a first wireless network;
 means for transmitting the first physical layer command to a Node B of a second wireless network to suspend data transmission,
 the first physical layer command being transmitted when determining to measure the first wireless network;
 means for detecting that the Node B has suspended the data transmission;
 means for tuning away from the second wireless network to measure the first wireless network;
 means for measuring the first wireless network after tuning away; and means for transmitting a second physical layer command to the Node B to resume data transmission after the measurement of the first wireless network is completed.

10. The user equipment of claim 9 in which the first physical layer command and the second physical layer command are transmitted using uplink synchronization shift bits.

11. The user equipment of claim 9 in which the data transmission is on at least one of a downlink dedicated physical channel and an uplink dedicated physical channel.

12. The user equipment of claim 9 further comprising means for, prior to transmitting the first physical layer command, determining to perform a flow control of data.

13. The user equipment of claim 12 further comprising means for, prior to transmitting the second physical layer command, determining not to perform the flow control of data.

14. The user equipment of claim 9 further comprising means for repeating transmission of the first physical layer command until detecting that the data transmission has been suspended.

15. The user equipment of claim 9 further comprising means for repeating transmission of the second physical layer command until detecting that the data transmission has resumed.

16. The user equipment of claim 9 in which the second wireless network comprises a time division-synchronous code division multiple access (TD-SCDMA) network.

17. A computer program product, comprising:
 a non-transitory computer-readable medium having program code recorded thereon, the program code when executed by a computer cause the computer to perform a method comprising:
 determining, at a user equipment (UE) prior to transmitting a first physical layer command, whether to measure a first wireless network;
 transmitting, from the UE, the first physical layer command to a Node B of a second wireless network to suspend data transmission, the first physical layer command being transmitted when determining to measure the first wireless network;
 detecting, at the UE, that the Node B has suspended the data transmission;
 tuning away from the second wireless network measure the first wireless network;
 measuring, at the UE, the first wireless network after tuning away; and, transmitting, from the UE, a second physical layer command to the Node B to resume data transmission after the measurement of the first wireless network is completed.

18. The computer program product of claim 17 in which the first physical layer command and the second physical layer command are transmitted using uplink synchronization shift bits.

19. The computer program product of claim 17 in which the data transmission is on at least one of a downlink dedicated physical channel and an uplink dedicated physical channel.

20. The computer program product of claim 17 further comprising, prior to transmitting the first physical layer command, to determine to perform a flow control of data.

21. The computer program product of claim 20 further comprising, prior to transmitting the second physical layer command, to determine not to perform the flow control of data.

22. The computer program product of claim 17 further comprising repeating transmission of the second physical layer command until detecting that the data transmission has resumed.

23. The computer program product of claim 17 further comprising repeating transmission of the second physical layer command until detecting that the data transmission has resumed.

24. The computer program product of claim 17 in which the second wireless network comprises a time division-synchronous code division multiple access (TD-SCDMA) network.

25. A user equipment (UE) configured for wireless communication, the UE comprising:
 at least one processor; and
 a memory coupled to the at least one processor, wherein the at least one processor is configured:
 to determine, prior to transmitting a first physical layer command, whether to measure a first wireless network;
 to transmit the first physical layer command to a Node B of a second wireless network suspend data transmission, the first physical layer command being transmitted when determining to measure the first wireless network; and
 to detect, at the UE, that the Node B has suspended the data transmission;
 to tune away from the second wireless network;

to measure, at the UE, the first wireless network after tuning away; and to transmit, from the UE, a second physical layer command to the Node B to resume data transmission after the measurement of the first wireless network is completed.

26. The user equipment of claim 25 in which the first physical layer command and the second physical layer command are transmitted using uplink synchronization shift bits.

27. The user equipment of claim 25 in which the data transmission is on at least one of a downlink dedicated physical channel and an uplink dedicated physical channel.

28. The user equipment of claim 25 wherein the at least one processor is further configured, prior to transmitting the first physical layer command, to determine to perform a flow control of data.

29. The user equipment of claim 28 wherein the at least one processor is further configured, prior to transmitting the second physical layer command, to determine not to perform the flow control of data.

30. The user equipment of claim 25 wherein the at least one processor is further configured to repeat transmission of the first physical layer command until detecting that the data transmission has been suspended.

31. The user equipment of claim 25 wherein the at least one processor is further configured to repeat transmission of the second physical layer command until detecting that the data transmission has resumed.

32. The user equipment of claim 25 in which the second wireless network comprises a time division-synchronous code division multiple access (TD-SCDMA) network.

* * * * *